United States Patent
Endo et al.

(10) Patent No.: US 12,372,306 B2
(45) Date of Patent: Jul. 29, 2025

(54) HEAT EXCHANGER AND METHOD FOR MANUFACTURING SAME

(71) Applicant: HONDA MOTOR CO., LTD., Tokyo (JP)

(72) Inventors: Tsuneo Endo, Saitama (JP); Yuta Kurosawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 245 days.

(21) Appl. No.: 18/128,656

(22) Filed: Mar. 30, 2023

(65) Prior Publication Data

US 2023/0314081 A1 Oct. 5, 2023

(30) Foreign Application Priority Data

Mar. 31, 2022 (JP) .................................. 2022-061348
Oct. 28, 2022 (JP) .................................. 2022-173685

(51) Int. Cl.
*F28F 13/12* (2006.01)
*B33Y 80/00* (2015.01)
*F28D 7/00* (2006.01)
*F28F 7/02* (2006.01)

(52) U.S. Cl.
CPC ............ *F28D 7/0066* (2013.01); *B33Y 80/00* (2014.12); *F28F 7/02* (2013.01); *F28F 13/125* (2013.01); *F28F 2250/106* (2013.01)

(58) Field of Classification Search
CPC .......... F28D 7/0066; B33Y 80/00; F28F 7/02; F28F 13/125; F28F 2250/106

USPC ...................................................... 165/109.1
See application file for complete search history.

(56) References Cited

U.S. PATENT DOCUMENTS

2021/0348856 A1  11/2021  Fujiwara

FOREIGN PATENT DOCUMENTS

| CN | 110030862 A | * | 7/2019 |
| JP | H10-259991 A | | 9/1998 |
| JP | 2020-046161 A | | 3/2020 |

* cited by examiner

*Primary Examiner* — Davis D Hwu
(74) *Attorney, Agent, or Firm* — Paratus Law Group, PLLC

(57) ABSTRACT

A heat exchanger, includes: a core portion; a first flow path which is provided in the core portion and through which a first fluid flows; and a second flow path which is provided in the core portion and through which a second fluid flows. The first fluid flowing through the first flow path and the second fluid flowing through the second flow path exchange heat through a partition in the core portion. The first flow path includes: a plurality of main flow paths; an introducing chamber; and a discharge chamber. The main flow path includes: an introducing side shape changing section in which a certain flow path is connected in a straight shape to the main flow path adjacent thereto; and a discharge side shape changing section in which the certain flow path is connected in a straight shape to the main flow path adjacent thereto.

10 Claims, 8 Drawing Sheets

FIG. 7
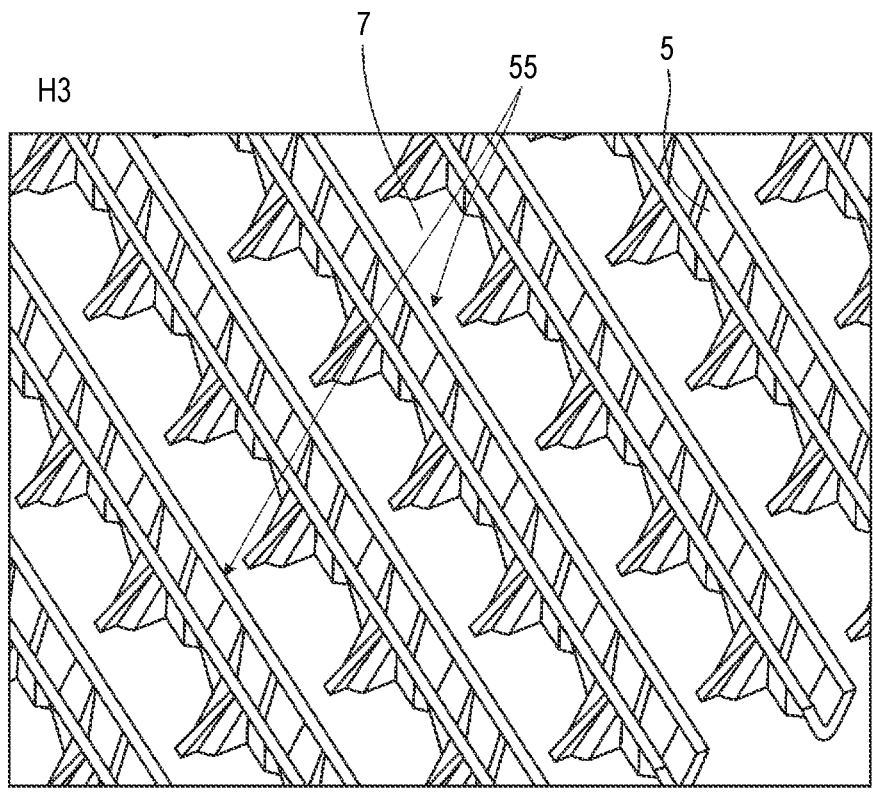
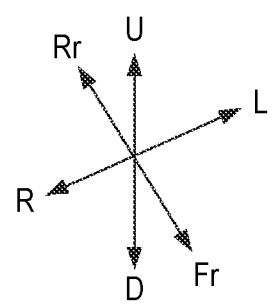

HEAT EXCHANGER AND METHOD FOR MANUFACTURING SAME

CROSS-REFERENCE TO RELATED APPLICATIONS

This application is based upon and claims the benefit of priority from Japanese Patent Application No. 2022-061348, filed Mar. 31, 2022, and Japanese Patent Application No. 2022-173685, filed Oct. 28, 2022, the entire contents of which are incorporated herein by reference.

TECHNICAL FIELD

The present disclosure relates to a heat exchanger and a method for manufacturing the same.

BACKGROUND ART

In the related art, heat exchangers using various heat transfer methods are widely used as the devices for transferring heat between two fluids having different temperatures.

In recent years, in order to allow more people to secure access to affordable, reliable, sustainable and advanced energy, many researches and developments are actively conducted to contribute to the energy efficiency. There is a need for the improved heat exchange efficiency in the heat exchanger to contribute to energy efficiency.

For example, JP-A-2020-046161 describes a heat exchanger provided with a plurality of tubular flow paths including a plurality of first flow paths in which a first fluid is circulated and a plurality of second flow paths in which a second fluid to exchange heat with the first fluid is circulated, in which the tubular flow paths have changing positions and outer shapes in a cross section orthogonal to a certain direction (extending direction of the flow path) according to the positions in the certain direction.

Meanwhile, when the shape of the flow path changes complicatedly in the heat exchanger as in the heat exchanger described in JP-A-2020-046161, pressure loss in the fluid may increase. In addition, obstructed flow of the fluid can cause reduced heat exchange efficiency. On the other hand, it is necessary to avoid obstructing the flow of the other fluid near the entrance of the flow path.

SUMMARY

The present disclosure provides a heat exchanger capable of preventing obstruction of the flow of the other fluid near the entrance of the flow path, while preventing an increase in pressure loss, and a method for manufacturing the same.

According to an aspect of the present disclosure, there is provided a heat exchanger, including: a core portion; a first flow path which is provided in the core portion and through which a first fluid flows; and a second flow path which is provided in the core portion and through which a second fluid flows, in which: the first fluid flowing through the first flow path and the second fluid flowing through the second flow path exchange heat through a partition in the core portion; the first flow path and the second flow path are tubular flow paths aligned in regular fashion; the first flow path includes; a plurality of main flow paths extending in a first direction and aligned in a second direction; an introducing chamber communicating with the plurality of main flow paths and extending in the second direction; and a discharge chamber communicating with the plurality of main flow paths and extending in the second direction; and the main flow path includes: an introducing side shape changing section in which a certain flow path is gradually changed in a cross-sectional shape as approaching to the introducing chamber and connected in a straight shape to the main flow path adjacent thereto; and a discharge side shape changing section in which the certain flow path is gradually changed in a cross-sectional shape as approaching to the discharge chamber and connected in a straight shape to the main flow path adjacent thereto.

According to another aspect of the present disclosure, there is provided a method for manufacturing a heat exchanger including: a core portion, a first flow path which is provided in the core portion and through which a first fluid flows, and a second flow path which is provided in the core portion and through which a second fluid flows, in which: the first fluid flowing through the first flow path and the second fluid flowing through the second flow path exchange heat through a partition in the core portion; the first flow path and the second flow path are tubular flow paths aligned in regular fashion; the first flow path includes: a plurality of main flow paths extending in a first direction and having a certain cross section of a flow path; an introducing chamber extending in the second direction and communicating with a plurality of the main flow paths, of the plurality of main flow paths, aligned in the second direction; and a discharge chamber extending in the second direction and communicating with a plurality of the main flow paths, of the plurality of main flow paths, aligned in the second direction; the main flow path includes: an introducing side shape changing section in which a certain flow path is gradually changed in a cross-sectional shape as approaching to the introducing chamber and connected in a straight shape to the main flow path adjacent thereto; and a discharge side shape changing section in which the certain flow path is gradually changed in a cross-sectional shape as approaching to the discharge chamber and connected in a straight shape to the main flow path adjacent thereto; and the method comprises integrally forming the core portion by additive manufacturing.

According to the present disclosure, since the cross-sectional shape of the flow path is gradually changed in the introducing side shape changing section and the discharge side shape changing section, it is possible to prevent pressure loss from increasing, and also prevent one flow of fluid from obstructing the other flow of fluid near the entrance of the one flow of fluid.

BRIEF DESCRIPTION OF THE DRAWINGS

FIG. 7 is a partially enlarged view of a cross-sectional perspective view of a position H3 in the up-down direction in the region D of FIG. 4.

DESCRIPTION OF EMBODIMENTS

Figure 1:
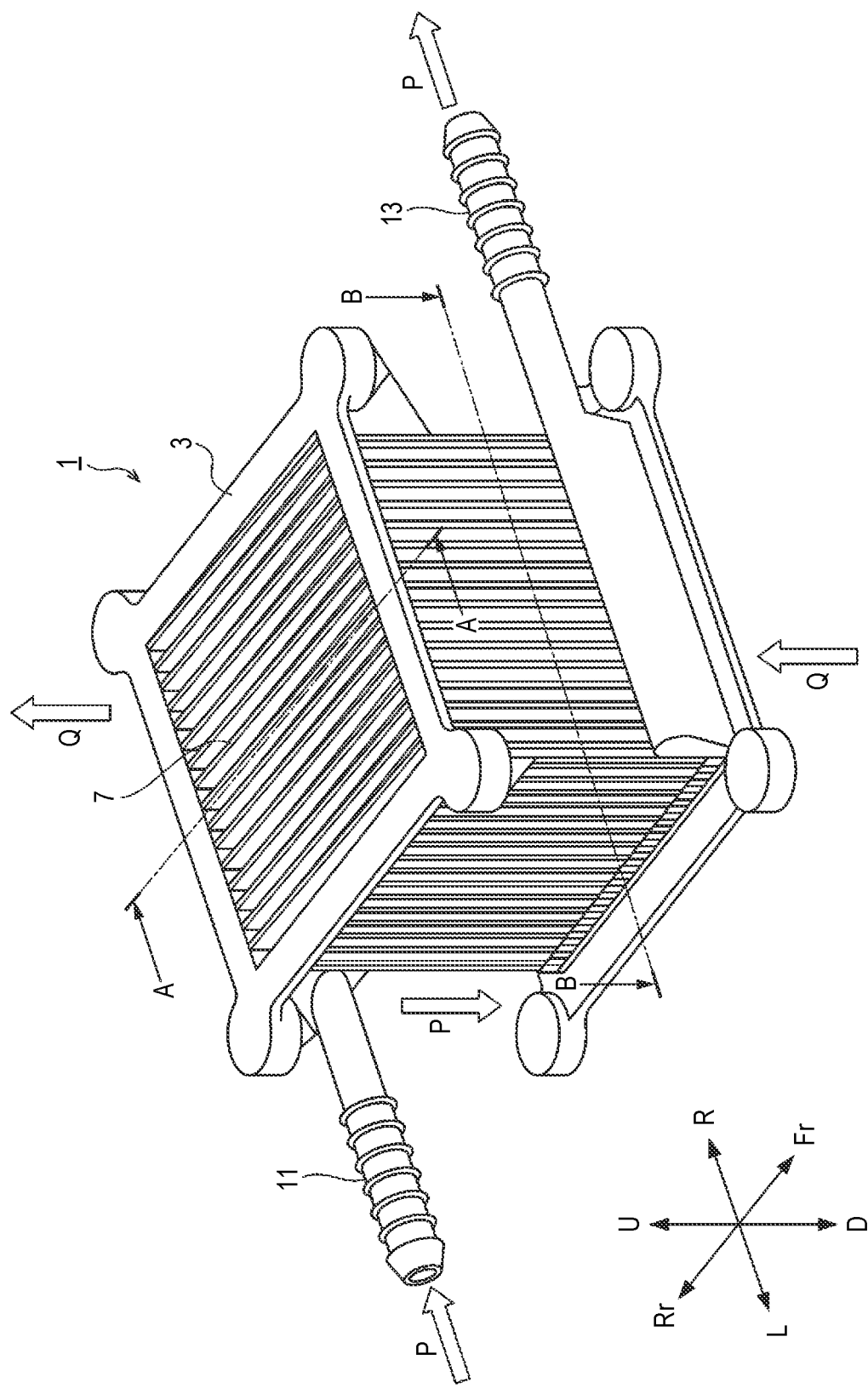
FIG. 1 is a perspective view of a radiator 1.

An embodiment of a heat exchanger of the present disclosure will be described below with reference to the accompanying drawings. It is assumed that drawings are viewed in direction of the reference numerals. A heat exchanger is a device for exchanging heat between a first fluid to be cooled and a second fluid to cool the first fluid through a partition. The properties of the first fluid and the second fluid are not particularly limited, and include all combinations such as gas-to-gas, liquid-to-liquid, and gas-to-liquid. The first fluid and the second fluid are, for example, water, oil, organic medium, air, and helium gas. Also, a device on which the heat exchanger is mounted is not particularly limited, and includes all products such as vehicles, a general-purpose device, aircraft, and home appliances. In the following embodiments, a radiator mounted on a vehicle will be described as an example of the heat exchanger of the present disclosure. That is, according to the embodiment described below, the first fluid is cooling water for cooling the drive source of the vehicle, and the second fluid is air (driving wind).

Figure 2:
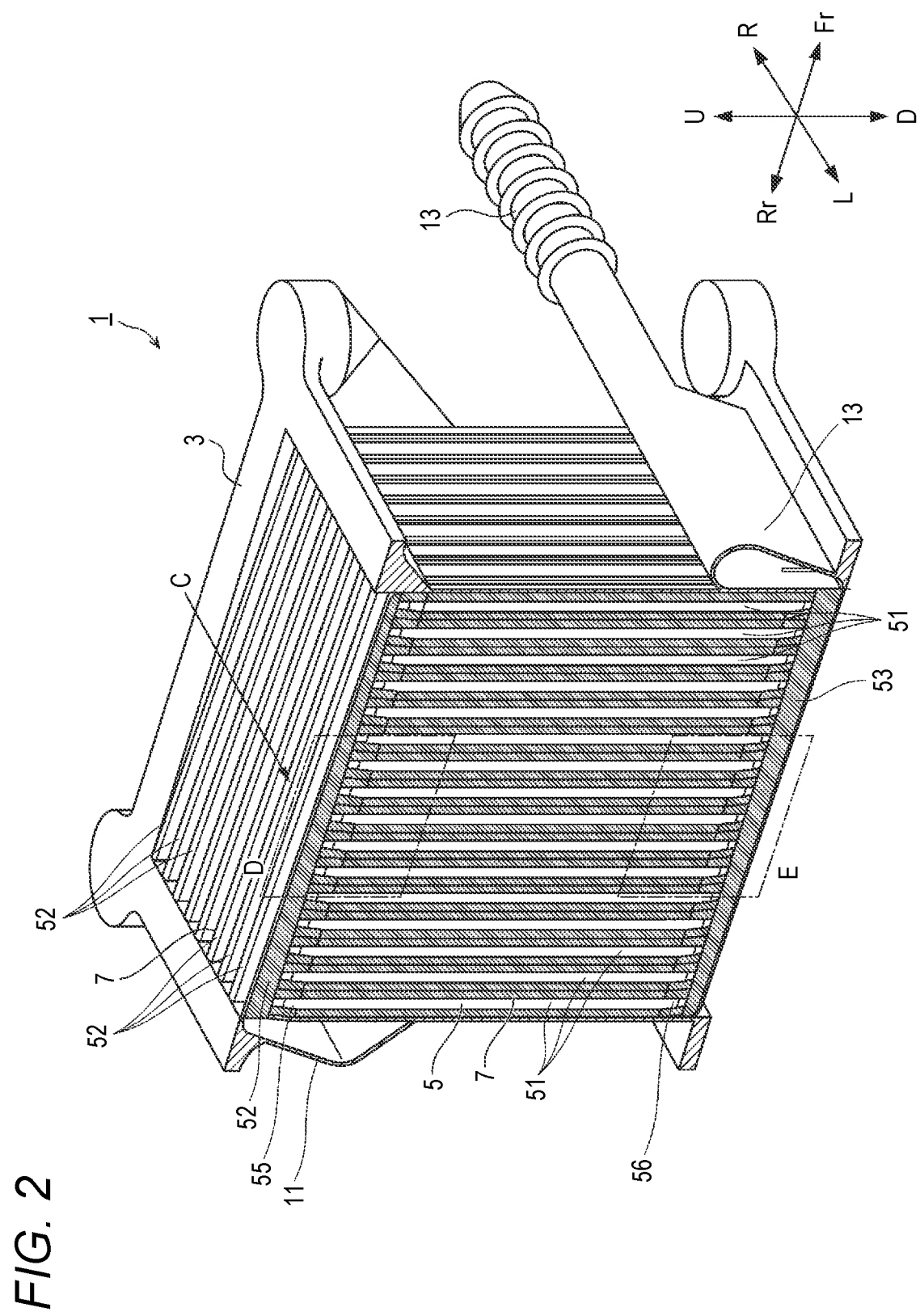
FIG. 2 is a partial perspective view showing a cross-section exposed along line A-A of FIG. 1.
Figure 3:
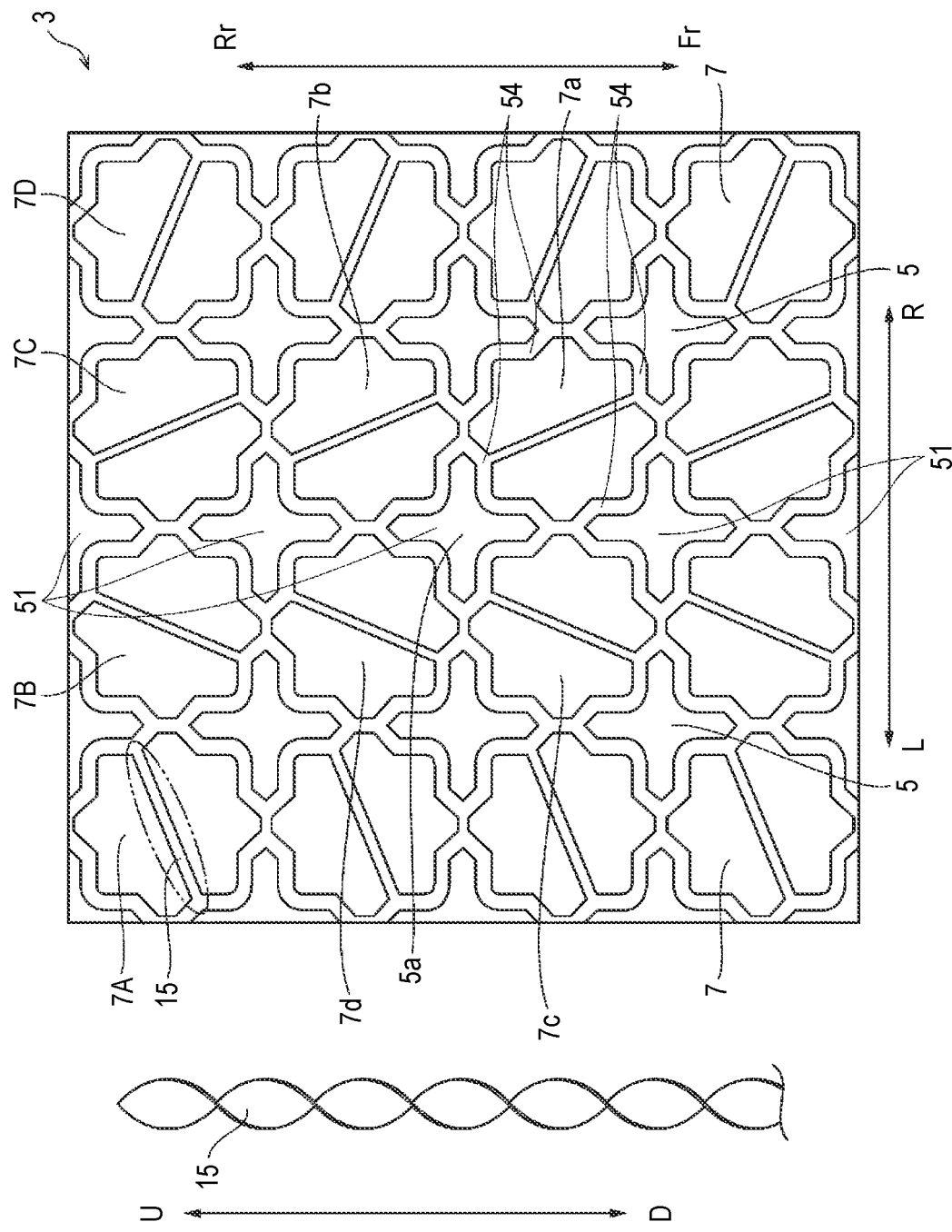
FIG. 3A is a partial cross-sectional view taken along line B-B of FIG. 1.
FIG. 3B is a view showing a twisted ribbon 15.

FIG. 1 is a perspective view of a radiator 1 according to an embodiment of the present disclosure. FIG. 2 is a partial perspective view of a cross section exposed along line A-A of FIG. 1 with respect to the radiator 1 of FIG. 1. FIG. 3A is a partial cross-sectional view of a portion of a cross section along line B-B of FIG. 1. For simplicity and clarity of the description, the radiator 1 will be described herein using an orthogonal coordinate system of three directions, that is, a front-rear direction, a left-right direction, and an up-down direction, as shown in FIG. 1. However, it is noted that these directions are irrelevant to the directions of the radiator 1 in the state of being mounted on the device. In the drawings, the upper side is denoted by U, the lower side is D, the left side is L, the right side is R, the front side is Fr, and the rear side is Rr.

The radiator 1 includes a core portion 3, a refrigerant flow path 5 provided in the core portion 3 through which cooling water flows, and an air flow path 7 provided in the core portion 3 through which air flows. In the core portion 3 of the radiator 1, heat is exchanged between the cooling water flowing through the refrigerant flow path 5 and the air flowing through an air flow path 7 through a partition 54 which will be described below. Therefore, there are differences from the related plate type that separates fluid by a flat plate (in some cases, heat transfer fins are added), the related fin tube type that exchanges heat through heat conduction by the flat plate fins around the circular tube, or the like. The core portion 3 includes an introducing pipe 11 provided at an upper portion of a rear surface, and a discharge pipe 13 provided at a lower portion of a front surface. The introducing pipe 11 and the discharge pipe 13 communicate with the refrigerant flow path 5 of the core portion 3.

As indicated by an arrow P, the cooling water is introduced from the outside into the core portion 3 through the introducing pipe 11 provided at the core portion 3, flows from the upper side to the lower side through the refrigerant flow path 5 in the core portion 3, and is discharged to the outside through the discharge pipe 13 provided at the core portion 3. Meanwhile, as indicated by an arrow Q, air is introduced from the lower surface of the core portion 3 into the core portion 3, flows from the lower side to the upper side through the air flow path 7 in the core portion 3, and is then discharged from the upper surface of the core portion 3. The refrigerant flow path 5 and the air flow path 7 are tubular flow paths aligned in regular fashion. The tubular flow path refers to a tube-shaped flow path having a closed shape such as an arc or a polygon in cross section.

As shown in FIG. 2, the refrigerant flow path 5 includes a plurality of main flow paths 51 extending in the up-down direction and aligned in the front-rear direction, an introducing chamber 52 extending in the front-rear direction and communicating with the plurality of main flow paths 51 aligned in the front-rear direction, and a discharge chamber 53 extending in the front-rear direction and communicating with the plurality of main flow paths 51 arranged in the front-rear direction. The refrigerant flow path 5 includes a plurality of sets formed in the left-right direction, in which each set includes the plurality of main flow paths 51 aligned in the front-rear direction, and the introducing chamber 52 and the discharge chamber 53 communicating with the main flow path 51. Therefore, as shown in FIG. 3A, the main flow paths 51 are regularly arranged in a grid pattern in a cross section in the up-down direction.

In the embodiment shown in FIG. 3A, the main flow path 51 has a cross-shaped flow path in cross section in which a space extending in the front-rear direction and a space extending in the left-right direction intersect each other forming a cross. Further, the main flow path 51 is not limited to the shape described above, and may take any shape such as square, rectangle, rhombus, trapezoid, circle, oval, star, triangle, polygon including pentagon, and so on, and other geometric patterns.

The introducing chamber 52 communicates with the introducing pipe 11 and the discharge chamber 53 communicates with the discharge pipe 13.

As shown in FIG. 2, the main flow path 51 includes, at an upper end, an introducing side shape changing section 55 in which the flow path is gradually changed in a cross-sectional shape as approaching to the introducing chamber 52 and connected in a straight shape to the main flow path 51 adjacent thereto, and, at a lower end, a discharge side shape changing section 56 in which the flow path is gradually changed in a cross-sectional shape as approaching to the discharge chamber 53 and connected in a straight shape to the main flow path 51 adjacent thereto. The introducing side shape changing section 55 and the discharge side shape changing section 56 will be described below.

As shown in FIG. 3A, the air flow path 7 includes a plurality of flow paths 7a surrounded and formed by the partitions 54 that partition the main flow path 51 into sections. There are a plurality of flow paths 7a to 7d and 7A to 7D (hereinafter, simply referred to as '7a' when it is not necessary to distinguish the flow paths from each other) in the front-rear direction and the left-right direction, extending in the up-down direction, and surrounded by the main flow paths 51 of the refrigerant flow path 5. The partitions 54 may include only straight lines, or may include curved lines, or may include only curved lines. Further, the main flow path 51 of the refrigerant flow path 5 and the flow path 7a of the air flow path 7 may not be necessarily adjacent to each other with the partition 54 interposed therebetween, and a region may be included, in which the flow paths 7a of the air flow path 7 are partially adjacent to each other. The flow path 7a communicates with the outside from the upper surface of the core portion 3 and communicates with the outside from the lower surface of the core portion 3. As a result, as indicated by the arrow Q in FIG. 1, air is introduced from the lower surface of the core portion 3 into the core portion 3, flows from the lower side to the upper side through the air flow path 7 in the core portion 3, and is then discharged from the upper surface of the core portion 3.

A twisted ribbon 15 is integrally provided in the flow path 7a, as shown in FIG. 3A. As shown in FIG. 3B, the twisted ribbon 15 is configured such that a thin plate is twisted around an axis extending in the up-down direction to one side in the circumferential direction, and stirs the flow of air flowing in the flow path 7a, thus improving the heat exchange efficiency.

Further, as shown in FIG. 3A, the twisted ribbon 15 is provided with different twisted phases in the air flow paths 7A, 7B, 7C, and 7D aligned in the left-right direction, and the same twisted phase in the air flow paths aligned in the front-rear direction. Note that the twisted phase can be set as appropriate.

Hereinbelow, referring to FIGS. 4 to 7, the introducing side shape changing section 55 provided at the upper end of the main flow path 51 of the refrigerant flow path 5 will be described in detail. Since the discharge side shape changing section 56 provided at the lower end of the main flow path 51 of the refrigerant flow path 5 has the same structure as the introducing side shape changing section 55, detailed description thereof will be omitted.

In the introducing side shape changing section 55 of the main flow path 51, the flow path is gradually changed in a cross-sectional shape as approaching to the introducing chamber 52 and connected in a straight shape to the main flow path 51 adjacent thereto.

Figure 4:
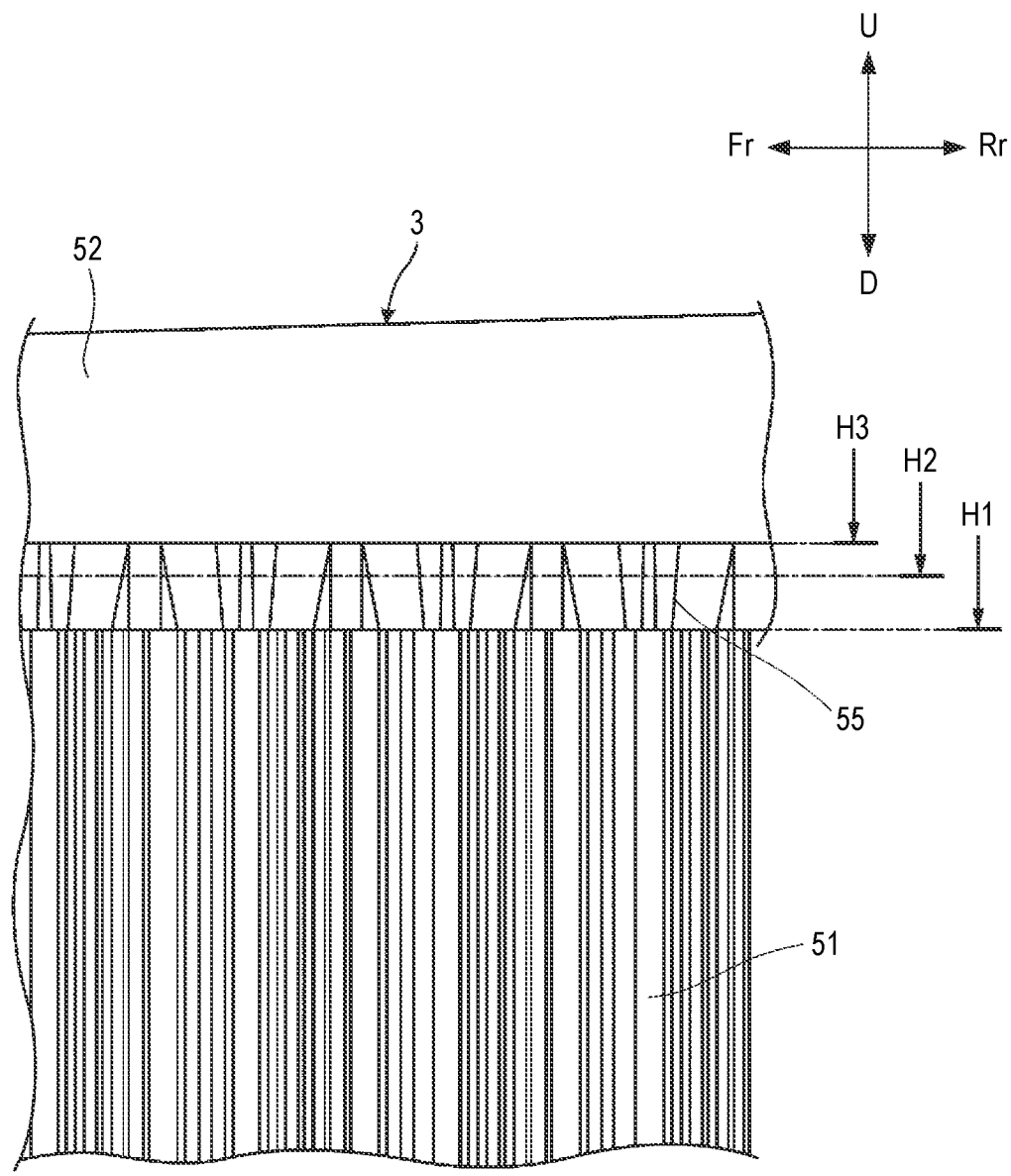
FIG. 4 is a view of a region D of FIG. 2 seen from C direction.
Figure 5:
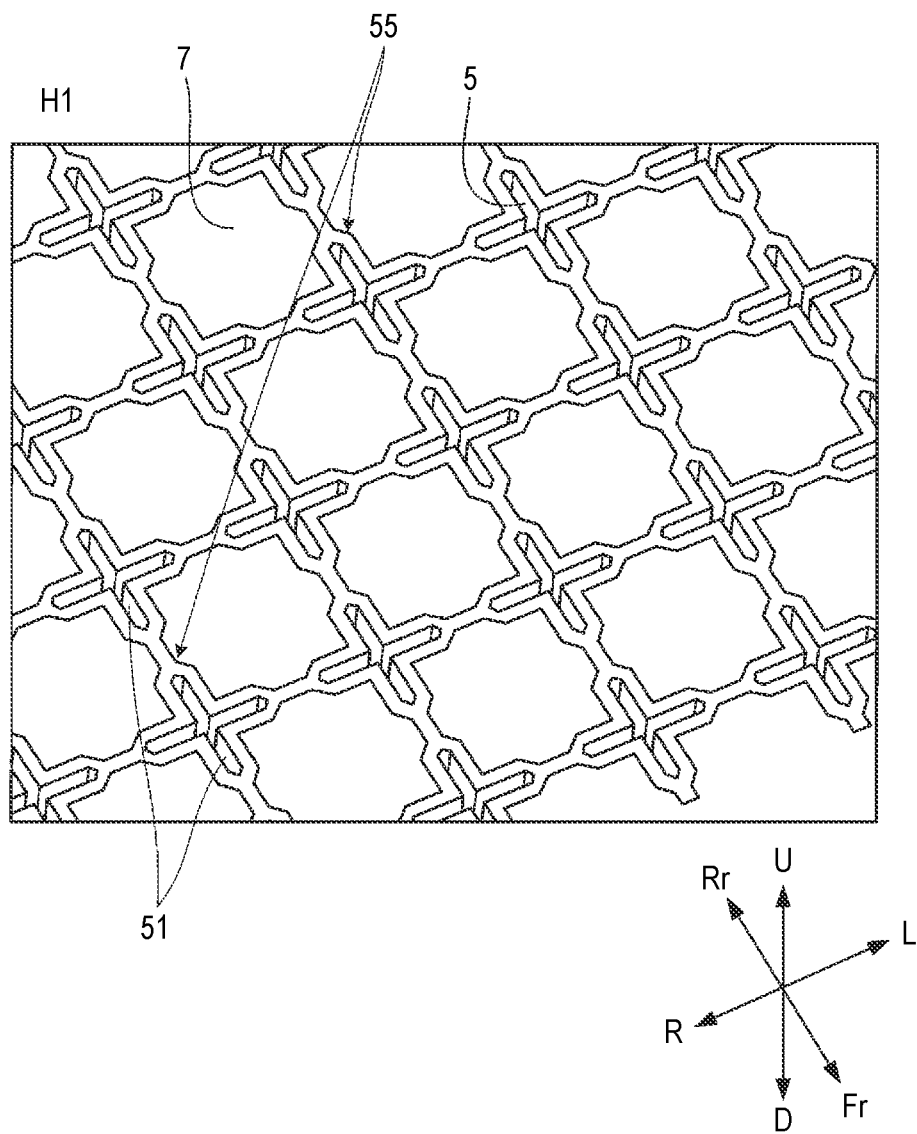
FIG. 5 is a partially enlarged view of a cross-sectional perspective view of a position H1 in an up-down direction in the region D of FIG. 4.
Figure 6:
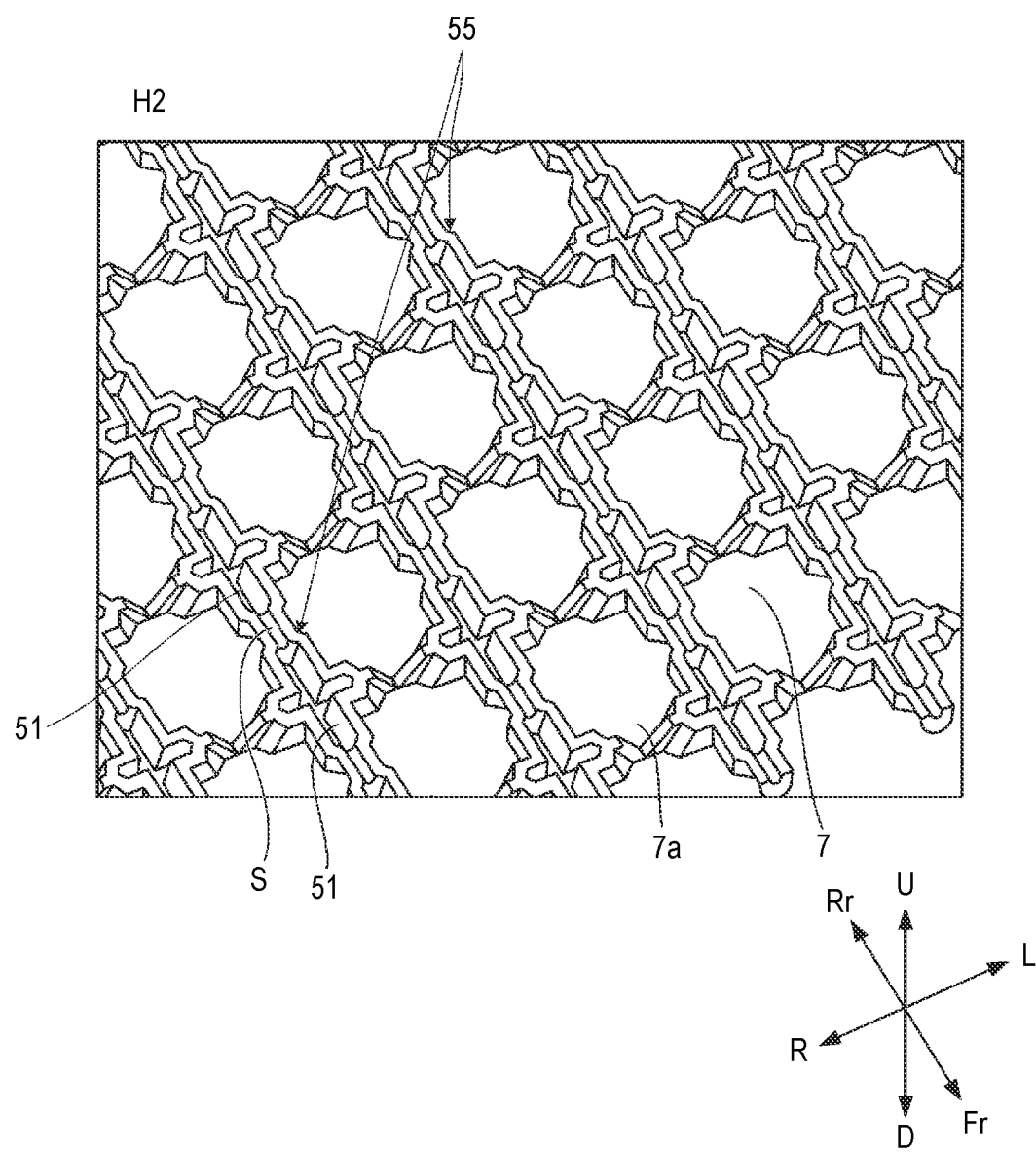
FIG. 6 is a partially enlarged view of a cross-sectional perspective view of a position H2 in the up-down direction in the region D of FIG. 4.
Figure 8:
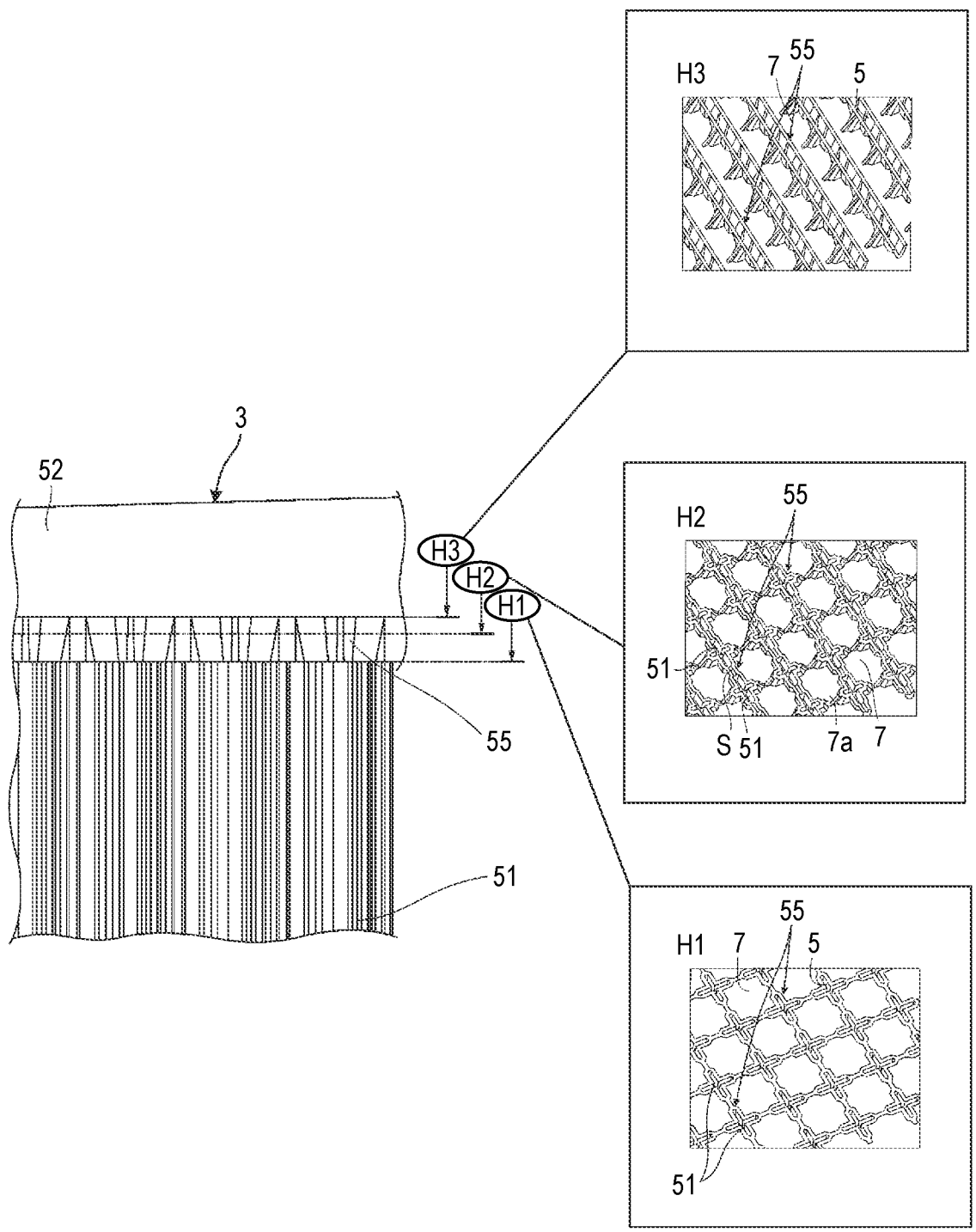
FIG. 8 is a collective view of the cross-sectional perspective views of positions H1, H2, and H3 in the up-down direction in the region D of FIG. 4.

FIG. 4 is a view of region D in FIG. 2 seen from C direction. The region D corresponds to the upper end of the refrigerant flow path 5 and the air flow path 7. FIG. 5 shows a partially enlarged view of a cross-sectional perspective view of a position H1 in the up-down direction in FIG. 4. Similarly, FIG. 6 shows a partially enlarged view of the cross-sectional perspective view of a position H2 in the up-down direction in FIG. 4. FIG. 7 shows a partially enlarged view of the cross-sectional perspective view of a position H3 in the up-down direction in FIG. 4, and FIG. 8 is a collective view of the cross-sectional perspective views of the positions H1, H2, and H3 in the up-down direction of region D in FIG. 4. The twisted ribbon 15 is not shown in FIGS. 5 to 8.

The partially enlarged view H1 in FIG. 5 corresponds to the lowermost enlarged view among the three enlarged views, which shows the position H1 in the up-down direction which is a starting point of the introducing side shape changing section 55. At the position H1 in the up-down direction, the refrigerant flow path 5 is in the shape shown in FIG. 3A. That is, the main flow path 51 of the refrigerant flow path 5 has the cross-shaped flow path in cross section. The adjacent main flow paths 51 in the front-rear direction and the left-right direction are independent.

The partially enlarged view H2 in FIG. 6 corresponds to the intermediate enlarged view among the three enlarged views, which shows the position H2 in the up-down direction which is an intermediate portion of the introducing side shape changing section 55. In the cross section of the flow path at the position H2 in the up-down direction, the cross-shaped flow path in cross section (FIG. 5) at the position H1 in the up-down direction changes as approaching to the introducing chamber 52 (upward) such that the flow path extending in the front-rear direction has both increased length and width, while the flow path extending in the left-right direction has both decreased length and width. Further, communication paths S are provided one by one between adjacent main flow paths 51 in the front-rear direction. The cross section of the flow path at the position H2 in the up-down direction changes as approaching to the introducing chamber 52 (upward) such that the flow path extending in the front-rear direction has both increased length and width, while the flow path extending in the left-right direction has both decreased length and width.

The cross-sectional area of the flow path of the main flow path 51 is constant in the introducing side shape changing section 55. That is, in the introducing side shape changing section 55, the flow path is gradually changed in the cross-sectional shape, but the cross-sectional area of the flow path does not change. Therefore, the cooling water can flow more smoothly, and occurrence of pressure loss can be prevented.

The partially enlarged view H3 in FIG. 7 corresponds to the uppermost enlarged view among the three enlarged views, which shows the position H3 in the up-down direction which is the end point of the introducing side shape changing section 55. The cross section of the flow path at the position H3 in the up-down direction is connected to the main flow path 51 adjacent thereto and forms a straight line in the front-rear direction. That is, the communication path S is indistinguishable from the flow path extending in the front-rear direction, and the flow path extending in the left-right direction is not present. The straight flow path in FIG. 7 communicates with the introducing chamber 52 positioned in the upper direction.

As described above, since the cross section of the flow path of the main flow path 51 is gradually changed by the introducing side shape changing section 55 and connected in a straight shape to the main flow path 51 adjacent thereto and communicated with the introducing chamber 52, the flow of air passing through the flow path 7a of the air flow path 7 formed between the main flow paths 51 is not blocked. As a result, the flow of air is not obstructed near the entrance of the main flow path 51.

Although not described in detail, the discharge side shape changing section 56 of the main flow path 51 likewise has the flow path gradually changed in a cross-sectional shape as approaching to the discharge chamber 53 and connected in a straight shape to the main flow path 51 adjacent thereto. Therefore, since the cross section of the flow path of the main flow path 51 is gradually changed by the discharge side shape changing section 56 and connected in a straight shape to the main flow path 51 adjacent thereto and communicated with the discharge chamber 53, the flow of air passing through the flow path 7a of the air flow path 7 formed between the main flow paths 51 is not blocked. As a result, the flow of air is not obstructed near the entrance of the main flow path 51. The air flowing from the gap of the introducing chamber 52 into the flow path 7a of the air flow path 7 flows through the flow path 7a and stirred while being guided by the twisted ribbon 15, and discharged to the outside through the gap of the discharge chamber 53.

Further, by changing only the shapes while maintaining the same cross-sectional area of the flow path in the introducing side shape changing section 55 and the discharge side shape changing section 56, increase in pressure loss of the cooling water is avoided.

Further, in the radiator 1 of the present embodiment, the core portion 3 is preferably manufactured with Additive Manufacturing Technology (hereinafter, "AM Technology") that can manufacture a component in complicated three dimensional shape by laminating and solidifying a powder material layer by layer.

Accordingly, it is possible to manufacture fine and complicated three-dimensional shaped components, which are difficult to manufacture with the related methods such as machining and casting. Further, the radiator 1 can be miniaturized.

Further, it is not limited to the core portion 3 only, and the introducing pipe 11 and the discharge pipe 13 as well as the core portion 3 can be integrally manufactured with the AM technology. When the core portion 3, the introducing pipe 11, and the discharge pipe 13 are separately manufactured, a process of assembling the introducing pipe and the discharge pipe to the core portion 3 is required, but this process can be omitted by integrally manufacturing with the AM technology. Further, the powder material may be resin or metal.

Although the embodiment of the present disclosure has been described above with reference to the accompanying drawings, it goes without saying that the present disclosure is not limited to such an embodiment. It will be apparent that those skilled in the art, within the scope described in the claims, can come up with various kinds of modification examples, or modifications, which are naturally within the technical scope of the present disclosure. In addition, the components in the embodiment described above may be arbitrarily combined without departing from the spirit of the disclosure.

For example, in the embodiment described above, the radiator 1 including the box-shaped core portion 3 is illustrated, but the core portion 3 may have a complicated shape that is three-dimensionally curved by the AM technology.

At least the following characteristics have been described herein. While the corresponding components and the like in the embodiments described above are indicated in parenthesis, embodiments are not limited thereto.

(1) A heat exchanger (the radiator 1), including: a core portion (the core portion 3); a first flow path (the refrigerant flow path 5) which is provided in the core portion and through which a first fluid (the cooling water) flows; and a second flow path (the air flow path 7) which is provided in the core portion and through which a second fluid (the air) flows, in which the first fluid flowing through the first flow path and the second fluid flowing through the second flow path exchange heat through a partition (the partition 54) in the core portion, the first flow path and the second flow path are tubular flow paths aligned in regular fashion, the first flow path includes: a plurality of main flow paths (the main flow paths 51) extending in a first direction (the up-down direction) and aligned in a second direction (the front-rear direction); an introducing chamber (the introducing chamber 52) communicating with the plurality of main flow paths and extending in the second direction; and a discharge chamber (the discharge chamber 53) communicating with the plurality of main flow paths and extending in the second direction, and the main flow path includes: an introducing side shape changing section (the introducing side shape changing section 55) in which a certain flow path is gradually changed in a cross-sectional shape as approaching to the introducing chamber and connected in a straight shape to the main flow path adjacent thereto; and a discharge side shape changing section (the discharge side shape changing section 56) in which the certain flow path is gradually changed in a cross-sectional shape as approaching to the discharge chamber and connected in a straight shape to the main flow path adjacent thereto.

According to (1), since the cross section of the main flow path is gradually changed by the shape changing sections and connected in a straight shape to the main flow path adjacent thereto, the flow of the second fluid is not blocked near the entrance of the main flow path.

(2) In the heat exchanger described in (1), the introducing side shape changing section and the discharge side shape changing section change the shapes of the cross sections of the flow paths while maintaining cross-sectional areas of the flow paths.

According to (2), the fluid can flow more smoothly.

(3) In the heat exchanger described in (1) or (2), the cross section of the certain flow path has a shape of a cross.

According to (3), it is possible to increase a contact area with the second fluid.

(4) In the heat exchanger described in (1) to (3), the first flow path includes a plurality of sets formed in a third direction (the left-right direction) orthogonal to the first direction and the second direction, in which each set includes the plurality of main flow paths, the introducing chamber, and the discharge chamber, and the second flow path has a plurality of flow paths surrounded and formed by the partitions that form the plurality of main flow paths.

According to (4), it is possible to miniaturize the heat exchanger by surrounding and forming the flow paths of the second flow path by the partitions that form the plurality of main flow paths.

(5) The heat exchanger described in (4), further including: a region where the second flow paths are adjacent to each other with the partitions interposed therebetween.

According to (5), the degree of freedom in forming the flow paths is improved.

(6) The heat exchanger described in (1) to (5), further including: a twisted ribbon (the twisted ribbon 15) provided in the second flow path.

According to (6), the heat exchange efficiency is improved by stirring the flow of the second fluid.

(7) In the heat exchanger described in any one of (1) to (6), the core portion is integrally formed by additive manufacturing.

According to (7), it is possible to manufacture fine and complicated three-dimensional shaped components, which are difficult to manufacture with the related manufacturing methods such as machining and casting.

(8) The heat exchanger described in (7), further including: an introducing pipe (the introducing pipe 11) communicating with the introducing chamber; and a discharge pipe (the discharge pipe 13) communicating with the discharge chamber, in which the core portion, the introducing pipe, and the discharge pipe are integrally formed by additive manufacturing.

According to (8), it is possible to omit the process of assembling the introducing pipe and the discharge pipe to the core portion.

(9) A method for manufacturing a heat exchanger (the radiator 1) including: a core portion (the core portion 3); a first flow path (the refrigerant flow path 5) which is provided in the core portion and through which a first fluid (the cooling water) flows; and a second flow path (the air flow path 7) which is provided in the core portion and through which a second fluid (the air) flows, in which the first fluid flowing through the first flow path and the second fluid flowing through the second flow path exchange heat through a partition in the core portion, and the first flow path and the second flow path are tubular flow paths aligned in regular fashion, the first flow path includes: a plurality of main flow paths (cross flow paths) extending in the first direction and having a certain cross section of the flow path; an introducing chamber (the introducing chamber 52) extending in the second direction and communicating with a plurality of main flow paths, of the plurality of main flow paths, aligned in the second direction; and a discharge chamber (the discharge chamber 53) extending in the second direction and communicating with the plurality of the main flow paths, of the plurality of main flow paths, aligned in the second direction, the main flow path includes: an introducing side shape changing section (the introducing side shape changing section 55) in which a certain flow path is gradually changed in a cross-sectional shape as approaching to the introducing chamber and connected in a straight shape to the main flow path adjacent thereto; and a discharge side shape changing section (the discharge side shape changing section 56) in which a certain flow path is gradually changed in a cross-sectional shape as approaching to the discharge chamber and connected in a straight shape to the main flow path adjacent thereto, and the method includes integrally forming the core portion by additive manufacturing.

According to (9), it is possible to manufacture fine and complicated three-dimensional shaped components, which are difficult to manufacture with the related manufacturing methods such as machining and casting. In addition, in the heat exchanger manufactured by the method, since the cross section of the flow path of the main flow paths is gradually changed by the shape changing sections before reaching the introducing chamber or the discharge chamber, the flow of the second fluid near the entrance of the main flow path is not blocked.

(10) In the method for manufacturing a heat exchanger described in (9), the heat exchanger includes: an introducing pipe (the introducing pipe 11) communicating with the introducing chamber; and a discharge pipe (the discharge pipe 13) communicating with the discharge chamber, and the method further includes integrally forming the core portion, the introducing pipe, and the discharge pipe by additive manufacturing.

According to (10), it is possible to omit the process of assembling the introducing pipe and the discharge pipe to the core portion.

The invention claimed is:
1. A heat exchanger, comprising:
a core portion;
a first flow path which is provided in the core portion and through which a first fluid flows; and
a second flow path which is provided in the core portion and through which a second fluid flows, wherein:
the first fluid flowing through the first flow path and the second fluid flowing through the second flow path exchange heat through a partition in the core portion;
the first flow path and the second flow path are tubular flow paths aligned in regular fashion;
the first flow path includes:
a plurality of main flow paths extending in a first direction and aligned in a second direction;
an introducing chamber communicating with the plurality of main flow paths and extending in the second direction; and
a discharge chamber communicating with the plurality of main flow paths and extending in the second direction; and
the main flow path includes:
an introducing side shape changing section in which a certain flow path is gradually changed in a cross-sectional shape as approaching to the introducing chamber and connected in a straight shape to the main flow path adjacent thereto; and
a discharge side shape changing section in which the certain flow path is gradually changed in a cross-sectional shape as approaching to the discharge chamber and connected in a straight shape to the main flow path adjacent thereto.
2. The heat exchanger according to claim 1, wherein the introducing side shape changing section and the discharge side shape changing section change the shapes of the cross sections of the flow paths while maintaining cross-sectional areas of the flow paths.
3. The heat exchanger according to claim 1, wherein the cross section of the certain flow path has a shape of a cross.
4. The heat exchanger according to claim 1, wherein:
the first flow path includes a plurality of sets formed in a third direction orthogonal to the first direction and the second direction, in which each set includes the plurality of main flow paths, the introducing chamber, and the discharge chamber; and
the second flow path has a plurality of flow paths surrounded and formed by the partitions that form the plurality of main flow paths.
5. The heat exchanger according to claim 4, further comprising:
a region where the second flow paths are adjacent to each other with the partitions interposed therebetween.
6. The heat exchanger according to claim 1, further comprising:
a twisted ribbon provided in the second flow path.
7. The heat exchanger according to claim 1, wherein the core portion is integrally formed by additive manufacturing.
8. The heat exchanger according to claim 7, further comprising:
an introducing pipe communicating with the introducing chamber; and
a discharge pipe communicating with the discharge chamber, wherein
the core portion, the introducing pipe, and the discharge pipe are integrally formed by additive manufacturing.
9. A method for manufacturing a heat exchanger including:
a core portion,
a first flow path which is provided in the core portion and through which a first fluid flows, and
a second flow path which is provided in the core portion and through which a second fluid flows, wherein:
the first fluid flowing through the first flow path and the second fluid flowing through the second flow path exchange heat through a partition in the core portion;
the first flow path and the second flow path are tubular flow paths aligned in regular fashion;
the first flow path includes:
a plurality of main flow paths extending in a first direction and having a certain cross section of a flow path;
an introducing chamber extending in the second direction and communicating with a plurality of the main flow paths, of the plurality of main flow paths, aligned in the second direction; and a discharge chamber extending in the second direction and communicating with a plurality of the main flow paths, of the plurality of main flow paths, aligned in the second direction;

the main flow path includes:

an introducing side shape changing section in which a certain flow path is gradually changed in a cross-sectional shape as approaching to the introducing chamber and connected in a straight shape to the main flow path adjacent thereto; and a discharge side shape changing section in which the certain flow path is gradually changed in a cross-sectional shape as approaching to the discharge chamber and connected in a straight shape to the main flow path adjacent thereto; and the method comprises integrally forming the core portion by additive manufacturing.

10. The method according to claim 9, wherein the heat exchanger includes:

an introducing pipe communicating with the introducing chamber; and a discharge pipe communicating with the discharge chamber; and the method further comprises integrally forming the core portion, the introducing pipe, and the discharge pipe by additive manufacturing.

* * * * *